Feb. 18, 1958 R. J. ENYEART 2,823,554
SEPARABLE CONNECTION FOR LINKAGE MECHANISMS
EXTENDING BETWEEN TWO SEPARABLE BODIES
Filed April 18, 1955

INVENTOR.
Raymond J. Enyeart
BY
W. R. Robertson
Agent

United States Patent Office 2,823,554
Patented Feb. 18, 1958

2,823,554

SEPARABLE CONNECTION FOR LINKAGE MECHANISMS EXTENDING BETWEEN TWO SEPARABLE BODIES

Raymond J. Enyeart, Trumbull, Conn., assignor to Chance Vought Aircraft, Incorporated, Dallas, Tex., a corporation of Delaware Application April 18, 1955, Serial No. 501,917

2 Claims. (Cl. 74—469)

This invention relates to operating linkage mechanisms and more particularly to quickly separable connections for such operating linkage mechanisms.

An object of this invention is the provision of a separable connection in a linkage mechanism having no mechanical connectors between the two portions of the separable connection.

Another object of the invention is to provide a separable connection in a linkage operating mechanism which will be automatically separated when the two bodies carrying the separable connection are disjoined, and which will be automatically returned to operative condition when the bodies are again joined.

A further object of this invention is to provide a separable connection which is simple and rigid in construction, positive and efficient in operation and relatively economical to manufacture.

A still further object is the provision of an operating, separable connection, the co-acting parts of which are carried by separable bodies and incorporating an adjustment feature on one of the co-acting parts.

Other objects and advantages will be apparent from the drawings, specification and appended claims.

In the aircraft art it is a usual current procedure to make the aft section of an airplane fuselage detachable from the forward fuselage section in order to gain ready access to an aircraft jet engine for service or engine removal. The disjoining of the aft fuselage section is complicated by the control rods between the pilot's stick and the rudder or elevator control surfaces since these control rods run past the break joint between the two fuselage sections. It has been necessary for mechaniscs to loosen one end or the other of such control rods before the fuselage sections could be separated, often necessitating working with the hands in cramped, almost inaccessible areas to uncouple the rod end. The present invention eliminates those difficulties by providing a separable connection in the control rod consisting of a rocker arm portion mounted on one section of the fuselage and a pad positioned on the other section of the fuselage. When the fuselage sections are in joined relationship the pad fits between two legs of the rocker arm and is moved thereby thus providing continuity in the movement of the rod. The legs of the rocker arm may be provided with adjustments to give fine alignment between the parts of the separable connection.

Figure 1:
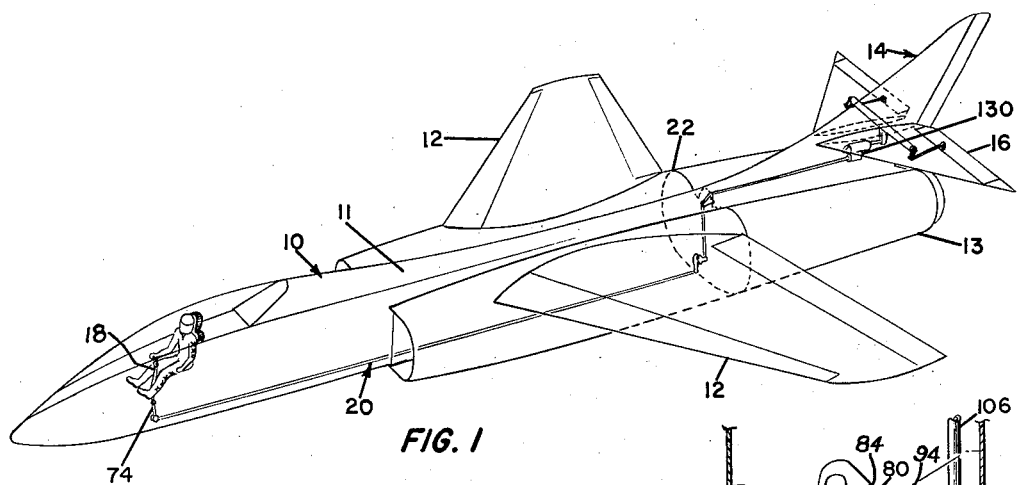
Figure 1 is a view of an airplane in phantom showing the control rod between the pilot's control stick and the elevator including the separable connection of the present invention.

In Figure 1 is shown an airplane 10, with the usual forward fuselage section 11, aft fuselage section 13, pair of wings 12, an empennage 14 including an elevator 16, and a pilot's control stick 18, while the linkage between the stick 18 and the elevator 16 is generally indicated by the numeral 20. A jet engine (not shown) is mounted within the fuselage near the aft end, and the numeral 22 indicates a joint line between the aft section 13 of the fuselage and the portion of fuselage 11 forward (nearer the airplane nose) of the joint line 22.

Figure 2:
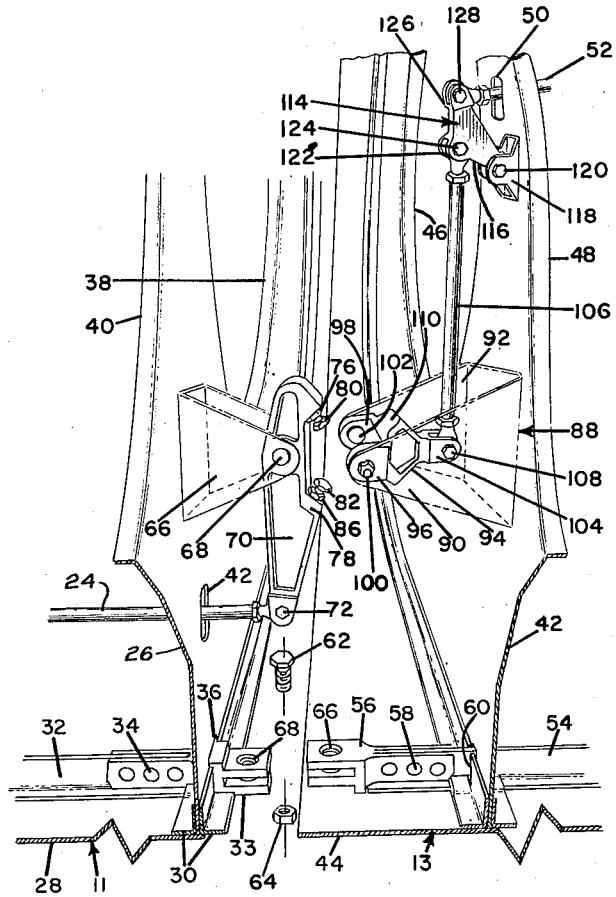
Figure 2 is a view on an enlarged scale of the separable connection showing the sections of the fuselage and the separable connector in disjoined relationship.
Figure 3:
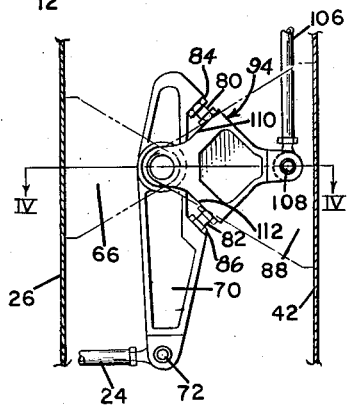
Figure 3 is a detail view of the connector in its joined position.
Figure 4:
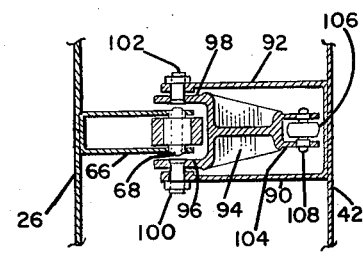
Figure 4 is a sectional view of the connector taken along lines IV—IV of Fig. 3.

The construction of the forward fuselage section 11 and the fuselage aft section 13 is best seen in Figs. 2 and 4 where a bulkhead 26 is securely fixed to the aft end of fuselage skin 28 through angle members 30. A series of longerons 32, of which one is shown, are secured within the periphery of fuselage 11, each of which carries a bifurcated locking member 33 secured at its aft extremity as by rivets 34 and extending through a suitable opening 36 in bulkhead 26. Bulkhead 26 may have cut-outs such as 38 and 40 to accommodate the jet engines, and opening 42 to accommodate the passage of a rod 24 of control linkage 20 through the bulkhead.

Similarly, bulkhead 42 is secured to fuselage skin 44 of aft fuselage section 13 spaced a short distance from the end of skin 44. Bulkhead 42 may have cut-outs such as 46 and 48 to accommodate the engines, and opening 50 for the passage therethrough of a rod 52 of linkage 20. A series of longerons 54, of which one is shown, are secured within the periphery of aft section 13, each of which carries a bifurcated end locking member 56 secured to its forward extremity as by rivets 58 and extending through a suitable opening 60 in bulkhead 42. Bifurcated members 56 are adapted to mate with the bifurcated members 33 in order that they may be fastened together as by bolts 62 inserted through suitable openings 66 and 68 in bifurcated locking members 33 and 56, respectively, and secured by nuts 64. When locking members 33 and 56 are thus securely locked together the fuselage aft section 13 will be fixedly joined to the fuselage front section 11. Access to the locking members for inserting and tightening the bolts 62 and nuts 64 may be had through suitable access doors (not shown) in the fuselage skin.

The separable connection for the linkage 20 between the separable bodies will now be described. A bifurcated bracket 66 is fixedly attached to the aft surface of bulkhead 26 and includes a pivot pin 68 between its arms on which is pivotally mounted a rocker arm 70, one leg of which is pivotally attached by pin 72 to the eye on the end of rod 24 which extends from the pilot's control stick 18 to the depending end 74 of which it is pivotally attached at a point spaced from the pivotal mounting of the control stick. Rocker arm 70 has an indentation on its aft surface defined by slanting end walls 76 and 78 having threaded apertures in which are inserted studs 80 and 82 the heads of which have arcuate facing surfaces. Studs, or adjustable members, 80 and 82 are held in fixed positions by jam nuts 84 and 86 respectively but may be adjusted to project any required amount above the surface of walls 76 and 78. A bifurcated bracket 88 is fixedly secured to bulkhead 42 and has forwardly facing arms 90 and 92 which are spaced apart a greater distance than the arms of bracket 66, the arms 90 and 92 having co-axial apertures near their extremities. An abutment member 94 has forwardly extending legs 96 and 98 which are pivotally attached to bracket arms 90 and 92 respectively by pivot pins 100 and 102, respectively. The other end 104 of member 94 is bifurcated and is pivotally attached to the end of a vertically extending rod 106 by pivot pin 108. The body of abutment member 94 has two beveled faces or pads 110 and 112 facing forwardly and lying on either side of the horizontal plane including the axes of pivot pins 100, 102 and 108 and being angularly disposed to that plane.

One leg 116 of a bellcrank 114 is pivotally secured by pivot pin 120 to a bracket 118 which is securely fastened to bulkhead 42. The second leg 122 of bellcrank 114 is pivotally secured to one end of rod 106 by pivot pin 124 while the third leg 126 of bellcrank 114 is pivotally attached to the forward end of rod 52 by pivot pin 128, the aft end of rod 52 being secured to an actuator 130 which moves the elevator 16.

When it is desired to join the two separable bodies, such as fuselage sections 11 and 13, they are moved into contiguous position, the skin 44 of aft section 13 sliding under the exposed flange of angle 30 of front fuselage section 11, and the locking end members 56 of longerons 54 of aft fuselage section 11 mating with the respective locking members 33 of longerons 32 of front fuselage section 11 whereby they may be securely fastened together by bolts 62 and nuts 64. In the joined position of the fuselage sections, the portion of the linkage connection on the aft fuselage section 13 will mate with the portion of the linkage connection on the forward fuselage section 11 since bracket 88 will be moved to a position where its legs 90 and 92 are outside of and astride the legs of bracket 66, and pivot pins 100 and 102 of abutment member 94 are then coaxially aligned with pivot pin 68 of rocker arm 70, in which position the abutment faces 110 and 112 of abutment member 94 will be contacted simultaneously by the arcuate faces of studs 80 and 82, respectively, of rocker arm 70. If any slack or play is present between the studs 80 and 82 and the respective abutment faces 110 and 112, it can be adjusted by movement of the studs and locking them in the new position by tightening of jam nuts 84 and 86. When studs 80 and 82 are in contact with the respective abutment faces 110 and 112, it can be seen that a continuous operative linkage exists from the pilot's control stick 18 to the elevator 16 through rods 24, rocker arm 70, studs 80 and 82, abutment faces 110 and 112, abutment member 94, rod 106, bellcrank 114 and rod 52, and yet that the one body carrying part of the linkage can be separated from the other body carrying the remainder of the linkage without any attention being necessary to the separation of the linkage.

Thus this invention provides a separable linkage connection between two separable bodies with an adjustment feature to be utilized as required.

While only one embodiment of the invention has been shown in the accompanying drawings, it will be evident that various modifications are possible in the arrangement, construction and utilization of the components of my separable connection without departing from the scope of the invention.

I claim:
1. A separable linkage connector for two separable bodies comprising; a rocker arm pivotally mounted on the first body and having a pair of inclined surfaces on either side of the pivotal mount facing the second body, a first linkage rod in said first body attached to one leg of said rocker arm, an adjustable stud mounted in each of said inclined surfaces presenting an abutting head, an abutment member pivotally mounted on said second body and having inclined abutment surfaces facing said first body and a second linkage rod in said second body connected to said abutment member, said abutting heads of said adjustable studs being maintained in continuous contact with the respective adjacent inclined abutment surfaces when said first and second bodies are positioned in joined relationship to provide for movement of said second linkage rod in response to movement of said first linkage rod and whereby the mere unjoining and separation of said first and second bodies provide unrestricted separation of said separable linkage connector.

2. A separable linkage connector for two separable bodies each having a linkage rod comprising; a bracket fixedly mounted on the first body, a rocker arm having a pivotal connection with said bracket and having an inclined surface on either side of said pivotal connection facing the second body, an operable connection between said rocker arm and the linkage rod of said first body, an adjustable stud in each inclined surface having a head defining an abutting surface, a second bracket mounted on said second body, an abutment member having a pivotal connection with said bracket and having a pair of inclined abutment surfaces, and an operable connection between said abutment member and the linkage rod of said second body, said pivotal connections being in coaxial alignment and said abutting heads of said adjustable studs being in continuous contact with the respective adjacent inclined abutment surfaces while said first and second bodies are joined together to provide for movement of the linkage of the second body in response to movement of the rocker arm by the linkage of the first body and whereby the mere unjoining and separation of said first and second bodies provide unrestricted separation of said linkage connection.

References Cited in the file of this patent

UNITED STATES PATENTS

| | | |
|---|---|---|
| 1,659,544 | Dodge | Feb. 14, 1928 |
| 1,708,373 | Weymouth | Apr. 9, 1929 |
| 1,720,421 | Londy | July 9, 1929 |
| 1,872,982 | Le Brie | Aug. 23, 1932 |
| 2,001,415 | Freeman | May 14, 1935 |
| 2,406,073 | Griswold et al. | Aug. 20, 1946 |